Dec. 31, 1963   B. E. MURTHA   3,116,407
METHOD OF FABRICATING A TUBE CLUSTER
Filed Sept. 6, 1961   4 Sheets-Sheet 1
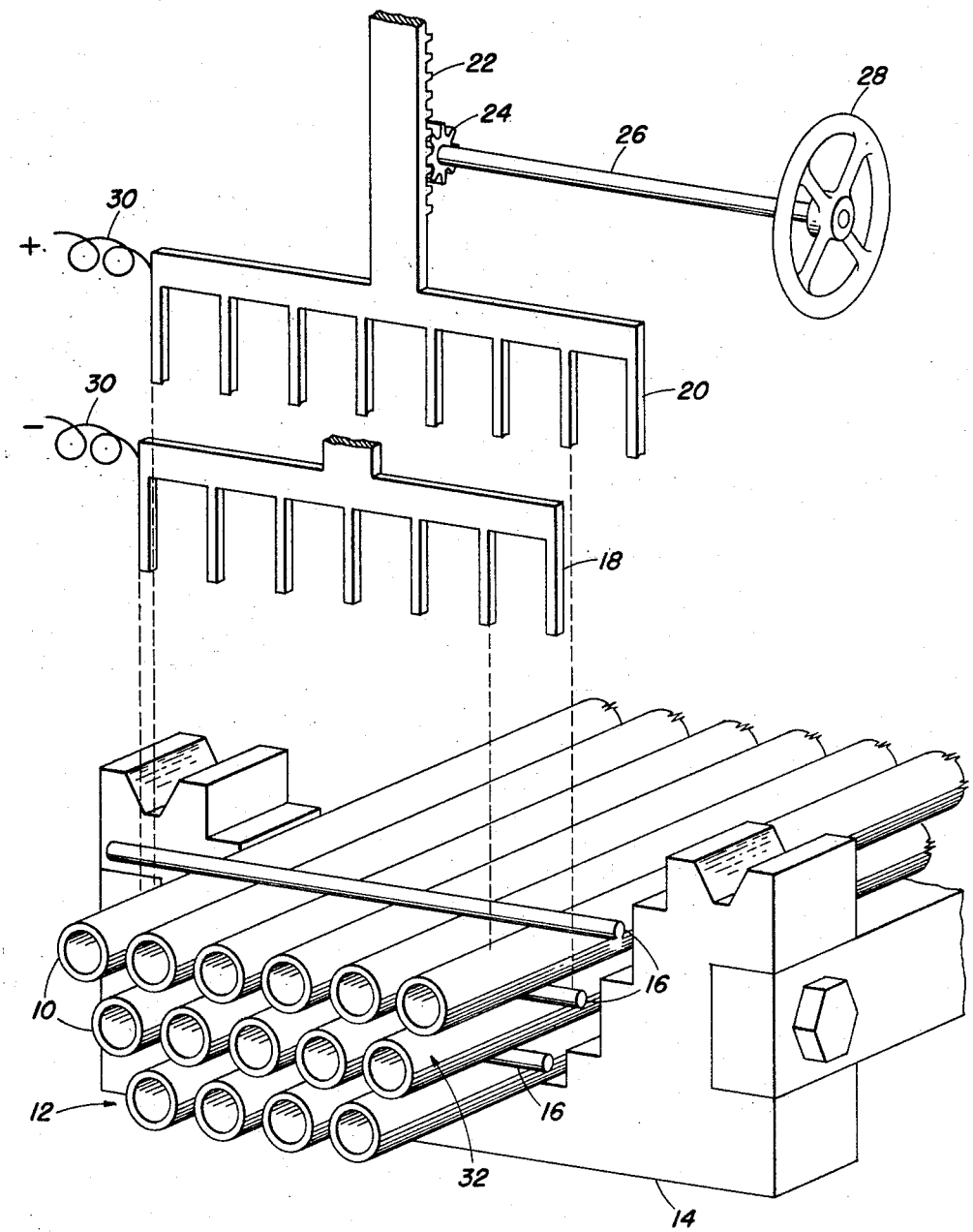
Fig. I.
INVENTOR
Bruce E. Murtha
BY *Eldon H. Luther*
ATTORNEY INVENTOR
Bruce E. Murtha
BY Elda H. Luther
ATTORNEY INVENTOR
Bruce E. Murtha
BY
ATTORNEY Dec. 31, 1963  B. E. MURTHA  3,116,407
METHOD OF FABRICATING A TUBE CLUSTER
Filed Sept. 6, 1961  4 Sheets-Sheet 4
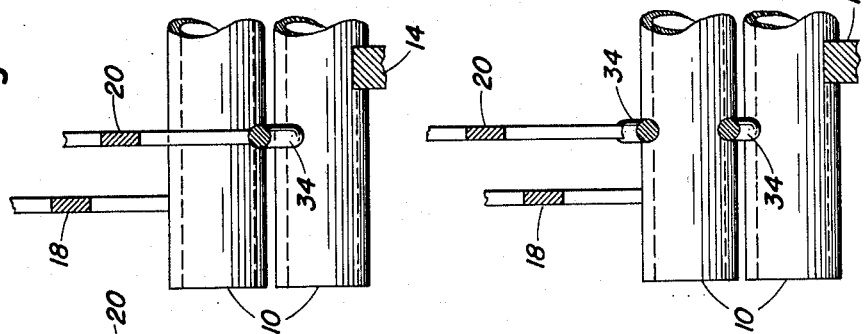
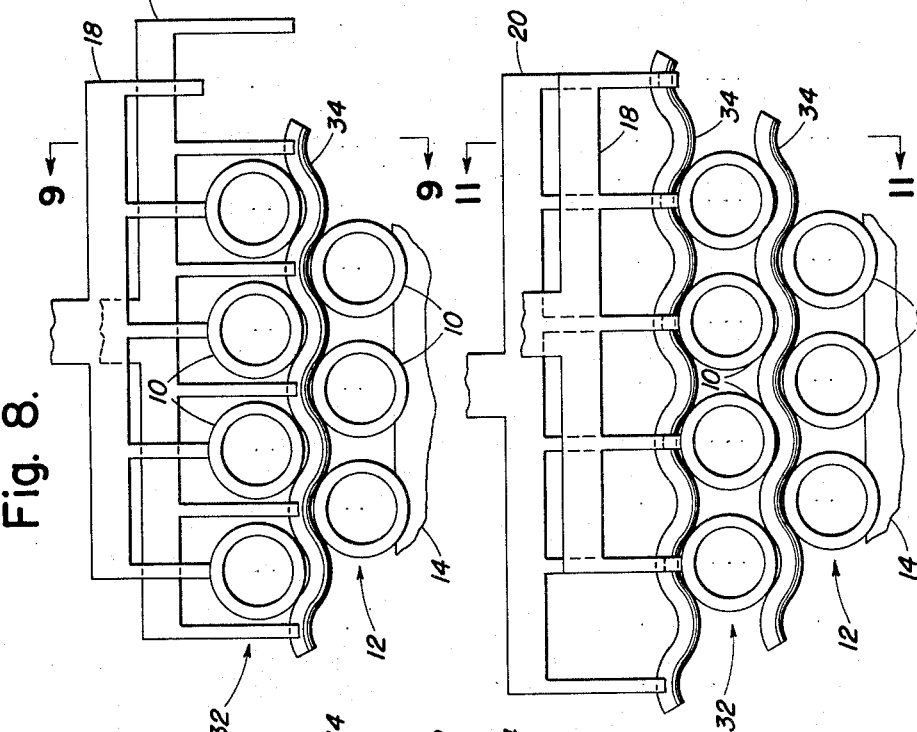
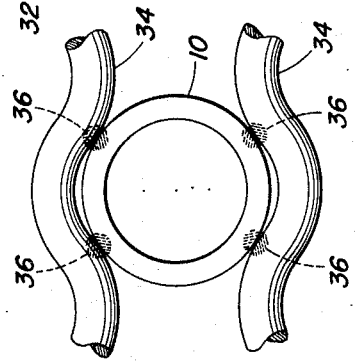
INVENTOR
Bruce E. Murtha
BY
*Eldon H. Luther*
ATTORNEY 3,116,407
METHOD OF FABRICATING A TUBE CLUSTER
Bruce E. Murtha, Wethersfield, Conn., assignor to Combustion Engineering, Inc., Windsor, Conn., a corporation of Delaware
Filed Sept. 6, 1961, Ser. No. 136,282
15 Claims. (Cl. 219—117)

This invention relates generally to the assembling of tubes into a bundle of predetermined size and configuration and has particular relation to an improved method of assembling and maintaining very thin-walled tubes into a cluster wherein the tubes are retained in accurately spaced relation.

It is the object of the present invention to provide an improved method for fabricating a tube cluster wherein the tubes are retained in spaced relation, with the tubes being welded to suitable transversely extending spacers between the rows of tubes.

A further object of the invention is to provide an improved method of assembling such a tube cluster wherein each of the welds may be inspected during the assembly or fabrication process.

Still another object of the invention is to provide such a tube cluster wherein the tubes and spacers are welded by means of the "projection welding" technique.

Still another object of the invention is to provide an improved method of assembling such a tube cluster wherein the resulting cluster is capable of limited differential movement of the tubes, due to thermal expansion, without rupture of the welds.

In accordance with the present invention an assembly technique is used wherein the cluster is built up of layers of tubes one disposed upon the other with the layers being separated by suitable horizontally extending spacers and with the tubes in each layer being in spaced parallel relation. In assembling the tube cluster each layer is, in effect, assembled separately with the necessary welds to the spacers being effected for each layer before the next succeeding layer is superimposed thereon. In this manner the welds may be accurately controlled and they may be inspected with access being provided to each and every weld whereby assurance is had that each of the welds is without defect so that acceptance of the final product is assured.

The invention is concerned with the assembling into a cluster of very thin-walled and relatively small diameter tubes, for example, the tubes may be .500 in. in diameter with a wall thickness of .028 in. There are various industrial processes which require bundles of such tubes, as for example stainless steel tubes of the aforementioned approximate dimensions, with it being necessary that the bundle be of a relatively accurate dimension and that the tubes be positively retained in relatively accurate spaced relation so that it is necessary that the welds that secure the tubes to the spacers and accordingly secure the tubes in the desired spaced relation and array be of good integrity.

Because of the thinness of the tube walls and because it is necessary that the heat affected zone of the weld not penetrate the entire thickness of the tube walls (so that should a weld break or tear away a hole will not be produced in the tube wall) and further because it is highly desirable that the entire length of the tube and that the entire tube bundle not be heated to an annealing temperature so that hardened, half-hardened or tubes hardened to any desired degree may be utilized, the "projection welding" process is employed in assembling the tube cluster. "Projection welding" is a known form of welding, being a variety of resistance welding. In projection welding the resistance heating is concentrated into a restricted cross-sectional area of contact between the parts that are being welded together. The control of the restricted cross-sectional area of contact is achieved by the use of projections on one or more parts (hence the term "projection welding") or by a choice of geometry in the mating parts. An example of this latter is the welding of a sphere to a flat surface or the welding of two rods of circular cross-section which are placed perpendicular to each other (with this being the situation in the instant inventive process). In either of these cases a normal point contact would occur between the mating parts. In carrying out the "projection welding" process the parts to be welded are placed into contact with each other with a relatively low pressure and the two parts are connected to electrodes of opposite polarity and which lead to a power supply. A predetermined welding current is passed through the area of contact for a predetermined time and as a result the mating, contacting parts are plastically deformed due to the applied contact pressure and resistance heating, resulting in increasing the area of contact and forming a metallurgical bond between the two elements. The application and intensity of current is controlled in such a manner that the weld or in other words the heat affected zone does not penetrate the entire or full thickness of the tube wall. It should be pointed out that it is necessary, in order to provide this limitation of the heat affected zone that the areas in the region of the point of contact between the elements that are being welded together is not heated sufficiently to produce an extensive molten condition of the mating pieces, as is attained with fusion welding but the heating is limited so that the elements in this location are in a plastic condition which is on the verge of but normally below the molten range.

Other and further objects of the invention will become apparent to those skilled in the art as the description proceeds.

With the aforementioned objects in view, the invention comprises an arrangement, construction and combination of the elements of the invention organization in such a manner as to attain the results desired as hereinafter more particularly set forth in the following detailed description of an illustrative embodiment, said embodiment being shown by the accompanying drawings wherein:

FIG. 1 is a perspective view illustrating the process of the invention for assembling a tube cluster wherein a multiple type or multiple finger electrode is employed for effecting the simultaneous welding of the tubes of a single row to one of the spacers with this view depicting the assembly in a partial state of completion;

FIGS. 8 through 11 show somewhat similar operations in a modified process of assembly in accordance with the invention; and FIG. 12 is a detailed illustration showing the heat affected zones of the welds that are produced when a wave-shaped spacing wire is employed.

Figure 1A:
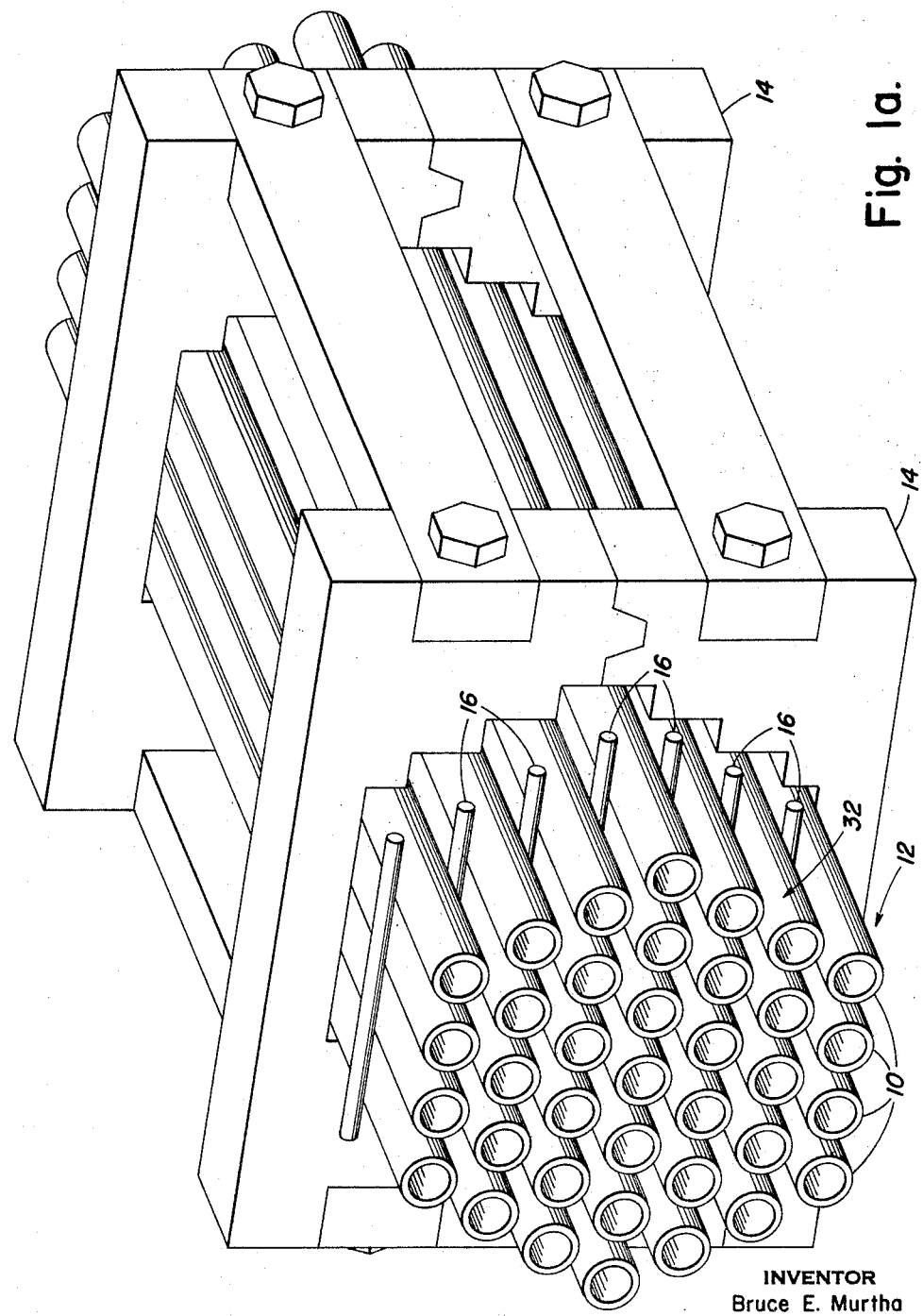
FIG. 1a is a view somewhat similar to that of FIG. 1 but showing the assembly in a completed state.

As previously mentioned the process of the invention employs an assembly procedure wherein the tube cluster is formed by means of building the cluster up with layers of tubes disposed one upon the other.

In the embodiment of the invention illustrated by the views identified in the drawing as 1 through 7, with this being one of the preferred embodiments and for certain sizes of clusters as well as certain tube diameters, wall thickness and spacer diameters being the most advantageous method, the tube bundle is formed by assembling layers of tubes one upon the other with the tube layers being positioned in a suitable jig. In the illustrations the tubes are identified as 10 and in assembling the tube cluster, which is of hexagonal transverse section in the form chosen for illustration, the lower layer or row 12 of tubes 10 is formed by placing the tubes in a suitable fixture 14 with this fixture having scallops or other suitable indentations to receive the tubes of this row 12 so as to space them in their proper relation. As shown there are four tubes in this lower row 12. It will be understood that the tubes are of substantial length, for example ten feet, and that there will be a number of jigs 14 spaced along the length of the tubes in order to suitably support the same.

Placed across this row of tubes 10 is a straight spacer wire or rod 16 of circular cross-section so that it has point contact with the tubes 10 of row 12. These spacers are positioned at suitably spaced locations throughout the length of the tubes, for example they may be placed every foot or so. After positioning a spacer wire across the row of tubes a pair of welding electrodes are lowered into position for effecting a simultaneous welding of the spacer to each of the tubes.

Figure 2:
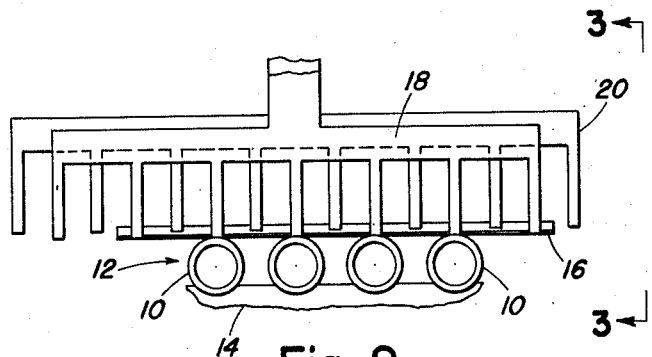
FIGS. 2 through 7 show various successive operations in one preferred process for assembling the tube cluster in accordance with the invention.
Figure 3:
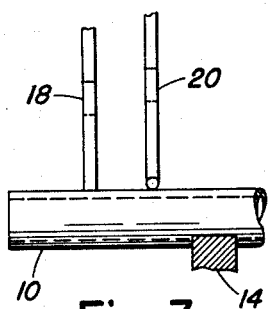

As shown, these welding electrodes include a multiple electrode number 18 which has a plurality of fingers with the lower end of these fingers being complementary and conforming to the surface of the tubes 10. Another electrode assembly 20, similar to that identified as 18, is employed with this other electrode assembly also having a plurality of fingers but with the ends of these fingers being complementary with and conforming to the surface of rod or spacer 16. These electrode assemblies are lowered into welding position as illustrated in FIG. 2 with the fingers of electrode assembly 18 engaging the tubes 10 of row 12 and with the fingers of electrode assembly 20 engaging the spacer wire 16. Because the fingers of these electrode assemblies conform with the tubes and the spacer wire, they make a good electrical contact, or in other words a low resistance electrical connection as compared with the point contact between the tubes 10 and the rods 16.

The electrode assemblies 18 and 20 may be vertically moved to and from their welding or engaging position with the tubes and the spacer by any suitable means and merely for the purpose of illustration there is shown a rack 22 and pinion 24 type of drive with the pinion being connected by a shaft 26 with hand wheel 28. The electrode assemblies are connected via conductors 30 across a suitable electrical potential with the circuit being controlled by means of a control switch.

After the electrodes are lowered into their welding position the connection across the electrical potential is completed or effected for a predetermined time, for example, if a 60 cycle per second A.C. source is utilized the voltage may be applied for a period of between one and two cycles. The electrodes are effective to cause the two members, i.e., the spacer 16 and the tubes 10, to be forced into engagement with a predetermined force and during the relatively short time that current is passed to the point contacts between these members they are heated at the location of this contact to a plastic state so that plastic deformation takes place and the spacer is welded to the tubes as explained previously in the description of "projection welding."

The several spacer rods or wires 16 that are positioned at the various locations along the length of the tube row 12 may be welded at the same time by having numerous electrodes assemblies to effect this result or each of the spacer rods may be welded to the tubes in succession by moving either the electrodes or the tube bundle longitudinally so that the electrodes may be properly positioned in successive relation for effecting the welding operation of the spacers.

After welding each of the spacer rods 16 to the tubes 10 of the row 12 the welds thus produced are inspected. This is a simple task with this particular construction since the welds are readily accessible. If a defective weld is found this weld may be repaired by repeating the welding process, and if desired electrodes which have a single finger rather than the multiple finger assemblies identified as 18 and 20 may be employed for repairing the defective weld.

After thus assembling the row of tubes 12 the next tube row identified as 32 is found by placing the tubes (there being five in the illustrative configuration) over the row of tubes 12 with the row 32 resting upon the spacers 16 that have just been welded to the tubes 10 in row 12. The tubes 10 in row 32 are positioned in their approximate desired spaced relation and the welding electrode assemblies 18 and 20 are lowered into engagement with the tubes 10 and the spacer 16 in the manner illustrated in FIG. 4 with the tubes in row 32 being welded to the spacer 16 in the same manner that the tubes in row 12 are welded to said spacer. It will be noted that in welding the row of tubes 32 to the spacer 16 which overlies the row of tubes 10 that the fingers of the electrode 20 must extend down between the tubes in the row 32. In order to prevent accidental contact between the fingers of electrode 20 and the tubes in this row the fingers are preferably provided on their lateral surfaces with electrical insulation. The fingers of the electrode 18 are effective to accurately space the tubes 10 in the row 32 with relation to each other since upon lowering the electrode into engagement with these tubes the tubes will be displaced laterally, if necessary, in order that the conforming face of the fingers of the electrodes will conform to and overlie the surface of the tubes.

Figure 4:
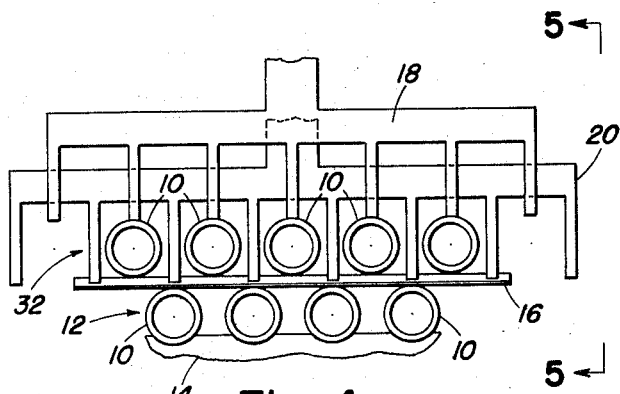
Figure 5:
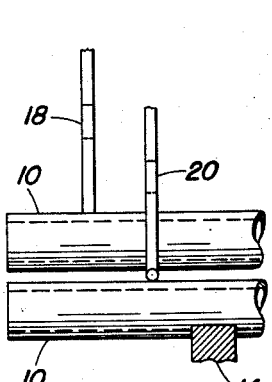

FIG. 4 shows the electrode assemblies 18 and 20 lowered into the position for welding the second row 32 of tubes to spacer bar 16. After welding this second row of tubes to each of the spacer bars that are spaced longitudinally along the row inspecting and repairing, if necessary, these welds, spacer bars are then placed on top of this row of tubes and welded thereto in the same manner that the spacer bar was welded to the first row of tubes.

Figure 6:
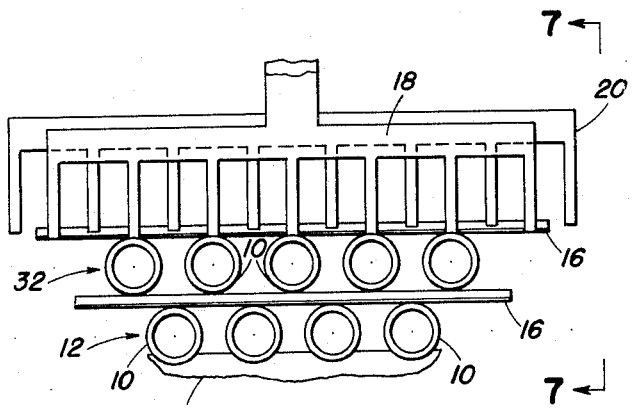
Figure 7:
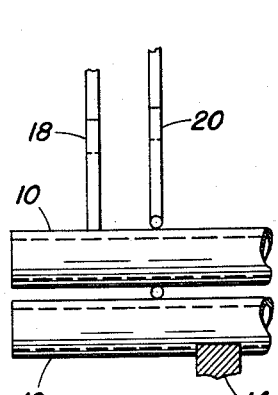

FIG. 6 shows the electrode assemblies 18 and 20 lowered into their welding position for welding a spacer bar 16 to the row 32 of tubes 10.

As illustratively disclosed the second, third, and fourth rows each contain one more tube than the immediate preceding row while the fifth, sixth, and seventh rows contain one less tube than the immediate preceding row with the jig being constructed to affect this result and with the bundle or tube cluster that is produced having a hexagonal transverse section as best shown in FIG. 1a. It will be appreciated that this is only illustrative of one tube configuration or tube geometry that may be employed with other configurations being useful and possible.

The illustrative method illustrated by FIGS. 1 through 7 is such as to provide for an economic way of assembling the tubes into a bundle with it being possible to inspect the assembly as it is being fabricated. As mentioned, each of the welds to the spacer tubes 16 is inspected after the welding of each row is completed. At this time these welds are readily accessible and inspection may be easily carried out with the welds being repaired should it be found defective. The use of straight spacer wires of circular cross-section and the staggering of the tubes in adjacent rows provides several advantages. This spacer wire is the most economic form that can be used with commercially available stock being satisfactory. Because of the configuration of the wire there is a single point contact between the wire and the tube which allows for a better weld with less pressure than if more than one contact is provided or if other than a point contact is provided. It is of course desirable and necessary in fact that the welding of the tubes be effected without dimpling the tubes. To achieve this, the pressure that is employed must be relatively light and the point contact lends itself to achieving this result. By the staggered tube arrangement the bond between the tubes and the spacer wire on opposite sides of the wire are displaced laterally along the wire. This lateral displacement is sufficient to allow limited relative axial movement between adjacent tubes, which movement may be necessary because of differential thermal expansion.

With the improved method of the invention the tubes may be welded into the bundle either while they are empty or while they may contain a desired material. This is so since the heat that is developed is very localized and the tube interior does not become heated to any substantial extent so as to destroy a material in the tube. This, of course, is in sharp contrast to a brazing process wherein the entire tube bundle is placed in a brazing furnace and its temperature raised to the brazing temperature. Also in contrast to the brazing process, the tubes employed with the method of the present invention may be hardened to any desired extent and since the temperature of the tube is not raised to the annealing temperature this hardening is not effected. With a brazing process, hardened tubes cannot be employed since they will be annealed during the brazing process.

FIGS. 8 through 12 disclose a modification of the method previously described in that in lieu of a straight spacer wire 16 a wave-shaped spacer wire 34 is employed. The undulations of this wire are such that the wire does not conform to the configuration of the tube but contacts the tube at only two points. The wire is of circular cross-section and the welding operation is carried out in the same manner as the straight wire. FIG. 8 corresponds generally with FIG. 4 of the previously described embodiment with the electrode assemblies 18 and 20 being lowered into engagement with the second row 32 of tubes 10 and the wave-shaped spacer wire 34, respectively. The electrodes force the tubes and the wire into engagement with a predetermined force and electrodes are connected across an electrical potential for a predetermined time, as described previously, so as to affect the welded juncture of the tubes and the spacer wires. FIG. 4 discloses the electrodes in welding position to weld the wave-shaped spacer wire to the upper portion of the second row 32 of tubes 10.

FIG. 12 is an enlarged view showing in detail that the wave-shaped spacer wires 32 contact the tubes at four locations with these locations being identified as 36 in this illustration.

In both the modification depicted in FIGS. 1 through 7 as well as the modification just described with regard to the illustration of FIGS. 8 through 12, the weld that is effected by "projection welding" is such that the depth of the heat affected zone can be controlled by a judicious choice of welding parameters and in this case extends approximately half-way through the wall of the tube. This is essential in the present invention since it is necessary to provide an attachment between the spacers 34 and 16 and the tube 10 which will not result in a hole being produced in the tube should the weld be pulled loose.

In the method described with regard to use of both the straight spacer 16 and the undulated spacer 34, the tube cluster has been described as being built up in rows of tubes with one row being placed upon the other and the welding operation thus effected and with the welding of the tubes to a spacer being accomplished in a single operation, i.e., each of the tubes being simultaneously welded to the spacer and with the electrode assemblies having a plurality of fingers for this purpose. In lieu of simultaneously welding the tubes of each row to a spacer wire, the tubes may be individually welded one at a time to the spacer wire with an electrode which has only a single finger being employed for this purpose. This is a slower and for the most part a less desirable way of welding the tubes but there are instances where it may have advantages over the simultaneous welding operation. Furthermore instead of assembling the tubes in layers and effecting the welding operation successively for each layer, the rows of tubes may be preassembled. For example, in a mass producing process there may be individual rows of tubes produced with a suitable jig being utilized to produce each of the rows. These preassembled rows may then be placed within the jig 14 one at a time to form the layers of the tube cluster and with the preassembled rows being welded together as they are successively positioned one on the other. With this process the assembly of the tube cluster may be effected in a more rapid manner.

To illustrate the invention by way of example, a tube cluster has been produced wherein the cluster has the number of rows and the number of tubes as well as the array disclosed in FIG. 1a. The tubes were Type 304 stainless steel with a wall thickness of .028 in. The straight spacer wires were Type 316 stainless steel with a diameter of .062 in. and the wires were spaced along the length of the tubes at approximately one foot intervals. The tubes were each welded to the wire in succession (while the tubes were empty) by means of a single electrode arrangement with each tube being welded separately. The wire and tubes were compressed together with a force of approximately 60 lbs. and a 60 cycle per second voltage source having a 7.9 maximum value was impressed across the electrode for 2 cycles of the 60 cycle source. After welding the spacer wires to each row the welds were inspected, with the defective welds, if any, being repaired. After preassembling the rows of tubes these rows are successively placed one on the other and welded together to form the cluster. In this welding operation a single electrode arrangement was employed with the wire and tubes being forced together with a force of about 100 lbs. As each row of tubes was welded to the row below, the welds were inspected and again, if defective welds were found, they were repaired.

Since the bundle is built up in layers the dimensions of the bundle may be progressively checked and retained within the desired tolerances.

While I have illustrated and described a preferred embodiment of my invention it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What I claim is:

1. The method of securing a group of thin-walled tubes into a bundle of accurate dimension and in which the tubes are accurately spaced comprising building said bundle in layers including the steps of providing a layer of parallel spaced tubes, positioning a spacer across said tube layer at longitudinally spaced locations, engaging the spacer with an electrode and the tubes with another electrode connected across a suitable electrical potential and forcing the spacer and tubes together, passing sufficient current through the juncture of the spacer and tubes to weld them together with a weld penetration that extends less than the full tube wall thickness, thereafter removing said electrodes, positioning another layer over said first layer in engagement with said spacer and similarly welding the tubes to the spacer.

2. The method of joining thin-walled metallic tubes into a bundle of accurate dimension and in which the tubes are accurately spaced comprising the steps of arranging a number of tubes in fixed spatial relation in a welding jig, positioning a straight spacer wire across these tubes at a plurality of locations spaced longitudinaly thereof, projection welding the spacer wire to the tubes at the region of contact therebetween by positioning an electrode in engagement with the spacer wire and another electrode in engagement with the tubes and connecting these electrodes across a suitable electrical potential, regulating this welding so that the heat affected zone is less than the wall thickness of the tubes, removing said electrodes, positioning another row of tubes with relation to the first-mentioned tubes and on the other side of the said spacer and in engagement therewith, and similarly projection welding these tubes to said spacer.

3. The method of joining thin-walled tubes into a bundle wherein the bundle is built up of layers of tubes in parallel coplanar space relation with the layers being spaced by means of a straight spacer wire of circular transverse section and with the tubes being welded to these spacer wires at the point contact therebetween, said method comprising the steps of forming a first layer of the tubes in a welding jig and placing a spacer wire thereon transversely of said layer and at longitudinally spaced locations therealong, simultaneously engaging a number of the tubes of said layer with a first electrode and the spacer wire with a second electrode, connecting said electrodes across a suitable electrical potential, regulating the application of said potential so as to weld the spacer to the tubes at the point contact therewith and in a manner so that the heat affected zone penetrates less than the thickness of the tube wall, welding each of the tubes to each of the spacer wires in this manner, positioning a second layer of tubes over said first layer and in engagement with the spacer wires, the tubes of said second layer being parallel with those of the first layer but located intermediate those of the first layer, similarly welding the tubes of the second layer to the spacer wire and and building up the tube bundle in layers.

4. In an organization of the type described and wherein a group of tubes are assembled into a bundle by means of welding and with the tubes being very thin walled and the spacing between adjacent tubes being accurately maintained and the gross dimension of the bundle held within close tolerances, the improved method of assembling comprising building the tube bundle up in vertically disposed layers one upon the other and including forming a first row of tubes in coplanar parallel accurately spaced relation, placing a wire spacer transversely of the tubes and extending across said layer, lowering a pair of welding electrodes with one electrode engaging each of the tubes and the other electrode engaging the wire spacer at the location immediately above each of the tubes, connecting said electrodes across a suitable electrical potential and projection welding the tubes to the spacer at the point contact therewith, thereafter removing said electrodes, forming the next row of tubes with these tubes being in parallel relation with those of the first row but having their axis disposed in planes intermediate those of the first row, similarly welding the tubes of the second row to said spacers, positioning a spacer transversely of said second row and similarly welding the spacer to the tubes of the second row and, building up a desired number of layers in like manner to produce a tube bundle of desired size.

5. The method as defined in claim 4 wherein the spacer is a straight wire of circular transverse section.

6. The method as defined in claim 4 wherein the spacer is a sinuously formed wire conforming generally to the tubes but arranged so as to contact each tube only at two contact points.

7. The method of securing a group of thin-walled tubes into a bundle wherein the tubes are accurately retained in spaced relation comprising building the bundle up in layers with each layer being comprised of a number of horizontally spaced parallel tubes, positioning spacer rods transversely of each layer and at spaced locations therealong with the rod and tube geometry being such that only point contact is had therebetween, projection welding the spacer rods to the tubes by engaging the spacer with an electrode and the tubes with another electrode and connecting the electrodes across a suitable electrical potential for sufficient time so as to weld the tube and spacer together with a weld penetration that extends less than the full tube wall thickness.

8. The method of securing a group of thin-walled tubes into a bundle of accurate dimension and within which the tubes are accurately spaced comprising positioning a number of tubes in a suitable jig in parallel spaced relation, placing spacer wires transversely of and in engagement with these tubes at suitable locations disposed longitudinally therealong with the tube geometry and spacer geometry being such that only point contact is had between each of the tubes and the spacer, projection welding the tubes to the spacers at the contact location therebetween by engaging the tubes and the spacer with electrodes and connecting the electrodes across an electrical potential of sufficient magnitude and for a sufficient time to weld the tubes and the spacer together at the location of contact with the weld having a heat affected zone that is less than the full thickness of the tube wall, assembling additional sets of parallel, spaced tubes in the aforesaid manner, after thus assembling these sets of tubes, building the tube bundle by assembling these sets in layers one on the other with the spacer wires disposed between adjacent layers and as each layer is positioned in place projection welding in the manner aforesaid, spacer wires disposed between this layer and the adjacent layer to tubes of these layers to which the spacer wires are not connected, whereby inspection of the welds of each of the sets of tubes after the welds to the particular set of tubes is completed may be had.

9. The method of securing a group of thin-walled tubes into a bundle of accurate dimension and in which the tubes are accurately spaced comprising building said bundle in layers including the steps of providing a layer of parallel spaced tubes, positioning a spacer across said tube layer at longitudinally spaced locations, engaging the spacer with an electrode and the tubes with another electrode connected across a suitable electrical potential and forcing the spacer and tubes together, passing sufficient current through the juncture of the spacer and tubes to weld them together with a weld penetration that extends less than the full tube wall thickness, thereafter removing said electrodes, positioning another layer over said first layer in engagement with said spacer, similarly welding the tubes to the spacer and repeating the foregoing steps to build the bundle into the desired number of layers.

10. The method of joining thin-walled metallic tubes into a bundle wherein the bundle is built up of layers of tubes in parallel spaced relation with the layers being spaced by means of an elongated metallic spacer and with the tubes being welded to these spacers at the point of contact therebetween, said method comprising the steps of forming a first layer of the tubes in a welding jig and placing an elongated metallic spacer thereon transversely of said layer and at longitudinally spaced locations therealong, simultaneously engaging a number of the tubes of said layer with a first electrode and the spacer wire with a second electrode, connecting said electrodes across a suitable electrical potential, regulating the application of said potential so as to weld the spacer to the tubes at the point of contact therewith and in a manner so that the heat affected zone penetrates less than the thickness of the tube wall, welding each of the tubes to each of the metallic spacers in this manner, positioning a second layer of tubes over said first layer and in engagement with the metallic spacers, the tubes of said second layer being parallel with those of the first layer but located intermediate of those in the first layer, welding in a similar manner the tubes of the second layer to the metallic spacer and building up the tube bundle in layers disposed one upon the other.

11. The method of securing a group of thin-walled tubes into a bundle wherein the tubes are accurately retained in spaced relation comprising building the bundle up in layers with each layer being comprised of a number of spaced parallel tubes, positioning spacer rods transversely of each layer in engagement with the tubes and at spaced locations therealong and electrically welding the spacer rods to the tubes by engaging the spacer with an electrode and the tubes with another electrode and connecting the electrodes across a suitable electrical potential for sufficient time so as to weld the tube and spacer together with a weld penetration that extends less than a full tube wall thickness and with the building up of the bundle in layers permitting inspection of the integrity of the welds associated with each layer.

12. The method of securing a group of thin-walled metallic tubes into a bundle comprising separately forming a plurality of tube assemblies by positioning a number of tubes in parallel spaced relation, placing a metallic spacer transversely of the tubes and across the assembly and at longitudinally spaced locations therealong, electrically welding the tubes to spacers by engaging the same with electrodes connected across a suitable electrical potential, after thus forming said plurality of assemblies building the tube bundle by assembling these assemblies in layers one on another with the spacers disposed therebetween and as each layer is positioned in place electrically welding in the manner aforesaid the spacer disposed between this layer and the adjacent layer to the tubes of these layers to which it is not connected.

13. The method of claim 12, wherein, in forming each assembly, a plurality of tubes are simultaneously engaged by an electrode and simultaneously are welded to the metallic spacer.

14. The method of securing a group of thin-walled metallic tubes into a bundle comprising forming a number of separate tube sets in the following manner, positioning a plurality of tubes in parallel spaced relation, placing a metallic spacer in engagement with the tubes and extending transversely thereof across the sets of tubes with such spacer being positioned at longitudinally spaced locations along the sets of tubes, projection welding the spacers to the tubes in a manner to simultaneously weld a plurality of the tubes to the spacers with the welding operation being such that the heat effected zone is less than the full thickness of the tube wall, after thus forming the separate tube sets, assembling the same into a bundle by positioning said sets one on another with the spacers disposed between adjacent sets and as each set is positioned in place, projection welding the spacer to the tubes of the set to which it is not connected and in the manner aforesaid.

15. The method of forming a bundle of thin-walled metallic tubes in a predetermined array of accurate dimension comprising positioning a plurality of tubes in parallel, generally coplanar, spaced relation, placing a wire spacer transversely of and in engagement with these tubes at a number of locations disposed longitudinally therealong, electrically welding the tubes to the spacers by simultaneously engaging a plurality of the tubes with an electrode and the spacer with another electrode and connecting these electrodes across an electrical potential of sufficient magnitude and for a sufficient time to simultaneously weld these tubes to the spacer at the location of contact therebetween with the weld having a heat effected zone that is less than the full thickness of the tube wall, assembling additional sets of parallel, generally coplanar, spaced tubes in the aforementioned manner, forming a bundle of these thus formed tube assemblies with the bundle being built in layers by placing the assemblies one adjacent the other so that spacer wires are disposed between each adjacent assembly and as each assembly is placed in its desired relation in forming the bundle electrically welding the spacer wire disposed between the adjacent pair of assemblies to the tubes of these assemblies to which it is not connected.

References Cited in the file of this patent

UNITED STATES PATENTS

| | | |
|---|---|---|
| 1,228,032 | Lackman | May 29, 1917 |
| 1,478,228 | Henry | Dec. 18, 1923 |
| 1,886,830 | Murray | Nov. 8, 1932 |
| 2,270,864 | Blaie | Jan. 27, 1942 |
| 2,313,280 | Szego | Mar. 9, 1943 |
| 2,338,467 | Tench | Jan. 4, 1944 |
| 2,577,123 | Hitchens et al. | Dec. 4, 1951 |
| 2,824,212 | Roberts | Feb. 18, 1958 |
| 2,883,517 | Rice et al. | Apr. 21, 1959 |

FOREIGN PATENTS

| | | |
|---|---|---|
| 1,205,004 | France | Aug. 10, 1959 |